US010099174B2

(12) United States Patent
Mulleder et al.

(10) Patent No.: US 10,099,174 B2
(45) Date of Patent: *Oct. 16, 2018

(54) PROCESS AND SYSTEM FOR THE PURIFICATION OF WASTE GASES CHARGED WITH NITROGEN OXIDES

(71) Applicant: Chemisch Thermische Prozesstechnik GmbH, Graz (AT)

(72) Inventors: Christian Mulleder, Grambach (AT); Franz Ortner, St. Georgen (AT)

(73) Assignee: CHEMISCH THERMISCHE PROZESSTECHNIK GMBH, Graz (AT)

( * ) Notice: Subject to any disclaimer, the term of this patent is extended or adjusted under 35 U.S.C. 154(b) by 0 days.

This patent is subject to a terminal disclaimer.

(21) Appl. No.: 15/159,682

(22) Filed: May 19, 2016

(65) Prior Publication Data

US 2016/0339382 A1 Nov. 24, 2016

(30) Foreign Application Priority Data

May 20, 2015 (DE) .................. 10 2015 108 014

(51) Int. Cl.
*B01D 53/34* (2006.01)
*B01D 53/86* (2006.01)
(Continued)

(52) U.S. Cl.
CPC ....... *B01D 53/343* (2013.01); *B01D 53/8625* (2013.01); *B01D 53/8631* (2013.01); *B01D 53/8653* (2013.01); *F23G 7/066* (2013.01);

*F23G 7/07* (2013.01); *F27D 17/008* (2013.01); *B01D 53/864* (2013.01); *B01D 53/90* (2013.01);
(Continued)

(58) Field of Classification Search
None
See application file for complete search history.

(56) References Cited

U.S. PATENT DOCUMENTS 5,569,312 A * 10/1996 Quirk ................. B01D 53/56
110/210
8,939,761 B2  1/2015 Mülleder
(Continued)

FOREIGN PATENT DOCUMENTS

DE  26 17 744 A1  11/1976
DE  38 21 480 A1  12/1989
(Continued)

*Primary Examiner* — Sheng H Davis
(74) *Attorney, Agent, or Firm* — Schwabe Williamson & Wyatt, PC (57) ABSTRACT

For purifying waste gas charged with nitrogen oxides in a reactor with heat-accumulator chambers containing heat-accumulator materials, the raw gas to be purified alternately enters one of the heat-accumulator chambers. Mixed with a reducing agent for the reduction of the nitrogen oxides, it is supplied to a catalyst for the reduction of the nitrogen oxides, and the clean gas heats the heat-accumulator material in the heat-accumulator chamber which the clean gas exits. A partial flow is taken therefrom, heated by means of a heat source and, mixed with a reducing agent, supplied again to the heat-accumulator chamber which the raw gas enters. This heated, recirculated gas forms the only heat source for the overall system.

15 Claims, 6 Drawing Sheets

(51) Int. Cl.
*F23G 7/07* (2006.01)
*F23G 7/06* (2006.01)
*F27D 17/00* (2006.01)
*B01D 53/90* (2006.01)

(52) U.S. Cl.
CPC ............. *B01D 2251/2062* (2013.01); *B01D 2251/2067* (2013.01); *B01D 2255/20707* (2013.01); *B01D 2255/20723* (2013.01); *B01D 2255/20776* (2013.01); *B01D 2257/70* (2013.01); *B01D 2258/0233* (2013.01); *B01D 2259/65* (2013.01); *B01D 2259/655* (2013.01)

(56) References Cited

U.S. PATENT DOCUMENTS

| | | | |
|---|---|---|---|
| 2002/0150526 A1* | 10/2002 | Hopkins | B01D 53/8628 423/239.1 |
| 2003/0202928 A1 | 10/2003 | Gravel | |
| 2008/0050297 A1* | 2/2008 | Harold | B01D 53/56 423/239.1 |
| 2009/0130011 A1* | 5/2009 | Abrams | B01D 53/8625 423/239.1 |
| 2014/0212349 A1* | 7/2014 | Mulleder | B01D 53/869 423/230 |

FOREIGN PATENT DOCUMENTS

| | | |
|---|---|---|
| DE | 44 13 359 A1 | 10/1995 |
| DE | 197 20 205 A1 | 11/1998 |
| DE | 199 05 733 A1 | 8/2000 |
| DE | 19905733 A1 | 8/2000 |
| DE | 102013100856 A1 | 7/2014 |
| EP | 0 472 605 A1 | 3/1992 |
| EP | 0472605 B1 | 3/1992 |
| EP | 0 667 181 A1 | 8/1995 |
| EP | 0 676 232 A1 | 10/1995 |
| EP | 0 682 975 A1 | 11/1995 |
| EP | 2 172 266 A1 | 4/2010 |
| JP | 76-68907 | 12/1977 |
| WO | WO1991/004780 | 4/1991 |
| WO | WO1995/017949 | 7/1995 |

* cited by examiner

PROCESS AND SYSTEM FOR THE PURIFICATION OF WASTE GASES CHARGED WITH NITROGEN OXIDES

CROSS-REFERENCE TO RELATED APPLICATION

The present application claims priority to German Patent Application No. 10 2015 108 014.1, filed May 20, 2015, entitled "Process and System for the Purification of Waste Gases Charged with Nitrogen Oxides," the disclosure of which is hereby incorporated by reference in its entirety for all purposes except for those sections, if any, that are inconsistent with this specification.

BRIEF DESCRIPTION OF THE INVENTION

The invention relates to a process for the purification of waste gases charged with nitrogen oxides according to the preamble of claim 1. In addition, it relates to a system for carrying out the process.

BACKGROUND OF THE INVENTION

Such a system is known from DE 197 20 205 A1. Since the purification of nitrogen oxides with the addition of a reducing agent is also known as selective catalytic reduction, the system is also referred to as SCR (selective catalytic reduction) system. By means of the reducing agent, the nitrogen oxides $NO_x$ (primarily nitrogen monoxide NO and nitrogen dioxide $NO_2$) contained in the waste gas are catalytically converted into nitrogen and water at a temperature of 200 to 450° C.

The known SCR system has a first reactor with two heat-accumulator chambers filled with heat-accumulator materials. The raw gas is preheated in the one heat-accumulator chamber, reheated in the combustion chamber and then, after the reducing agent has been added, supplied to a second reactor with the reduction catalyst. The heat-accumulator material in the second heat-accumulator chamber of the first reactor is heated by means of the denitrified hot clean gas exiting the reactor. After that, switching takes place, i. e. raw gas is supplied to the second heat-accumulator chamber in reverse flow and denitrified hot clean gas from the SCR reactor to the first heat-accumulator chamber etc.

Due to the separate SCR reactor and the addition of the reducing agent to the waste gas exiting the combustion chamber, the known system inter alia requires a significant expenditure for equipment. In addition, when the heat-accumulator chamber to which raw gas has been supplied is switched over to clean gas, the entire raw gas volume existing in this chamber is flushed into the clean gas channel, as a result of which the denitrification efficiency will be noticeably reduced.

The most frequently used SCR catalysts contain titanium dioxide as the main component (carrier material). Vanadium pentoxide as well as tungsten and, if necessary, molybdenum compounds are secondary components. In JP 76-68907, for example, a catalyst is described which consists of V and Nb components as active components on a $TiO_2$ carrier. A catalyst described in DE 38 21 480 contains $TiO_2$, V, Mo and/or W and Zn. In DE 26 17 744, tin is also cited as an optional active component. However, a plurality of different catalyst compositions were also described, for example Fe on oxidic carriers (EP 0 667 181 A1), various active components on zeolite carriers, for example Ce (WO95/17949), Cu (DE 44 13 359), Ag and Pt (EP 0 682 975 A1) or ordinary metal oxide catalysts, for example spinel $ZnAl_2O_4$ (EP 0 676 232 A1). In addition, a dioxin and furan depletion is successful in case of SCR catalysts (WO91/04780).

DE 199 05 733 B4 discloses a regenerative catalytic post-combustion system using 2n+1 pairs of heat-accumulator chambers which are each connected by means of a switching chamber, with n being an integer greater than 0. For the purpose of preheating, the raw gas to be purified is alternately supplied to the heated heat-accumulator material of n pairs of heat-accumulator chambers, and the denitrified hot clean gas is supplied to the heat-accumulator material of further n pairs of heat-accumulator chambers in reverse flow. In this process, one pair of heat-accumulator chambers is purged. The reduction of the nitrogen oxides with the reducing agent takes place on a catalyst material arranged in the heat-accumulator chambers on the side of the combustion chamber. Here, the reducing agent is added directly to the raw gas.

This arrangement is disadvantageous if the raw gas contains sulphur components, which, together with the reducing agent added, form solid deposits in salt form being capable of depositing on the heat-accumulator material. Such typical salts are, in particular, ammonium hydrogen sulphite, ammonium sulphite, ammonium hydrogen sulphate and ammonium sulphate.

It is the object of the invention to provide a SCR process and a SCR system for high flow rates with low expenditure for equipment, low operating costs and high denitrification efficiency.

According to the invention, this is achieved by the process characterized in claim 1 and the system characterized in claim 9. Advantageous embodiments of the invention are described in the sub-claims.

In the process according to the invention for the purification of waste gas charged with nitrogen oxides in a reactor with heat-accumulator chambers containing heat-accumulator materials, which are also referred to as regenerators, the waste gas or raw gas to be purified alternately enters at least one of the heat-accumulator chambers. By means of the heat-accumulator material in this chamber, the raw gas is preheated, then mixed with a reducing agent for reducing the nitrogen oxides and supplied to a catalyst for reducing the nitrogen oxides. The denitrified hot clean gas then heats the heat-accumulator material in the at least one heat-accumulator chamber which it exits.

By means of a recirculation system, a partial flow is taken from the at least one heat-accumulator chamber which the clean gas exits before the clean gas enters the heat-accumulator material thereof and, heated by means of a heat source and mixed with the reducing agent, is supplied to the heat-accumulator chamber which the raw gas enters after the raw gas has exited the heat-accumulator material thereof.

This means the system according to the invention has 2n pairs of heat-accumulator chambers. For forming the pairs of heat-accumulator chambers, the reactor consists of two structurally separated heat exchanger materials in order to form the individual heat-accumulator chambers.

The number n may be 1, 2, 3 or another integer greater than 0. The n pairs of heat-accumulator chambers are connected to a raw gas channel, and n pairs of heat-accumulator chambers are connected to a clean gas channel. In the simplest case, the system has thus one pair of heat-accumulator chambers, with one heat-accumulator chamber being connected to the raw gas channel and one heat-accumulator chamber being connected to the clean gas channel. If, for example, the system has four heat-accumulator chambers, hence n equals 2, two heat-accumulator chambers are connected to the raw gas channel, and two heat-accumulator chambers are connected to the clean gas channel. After a period of preferably 1 to 3 minutes, the heat-accumulator chamber connected to the raw gas is connected to the clean gas, and the heat-accumulator chamber connected to the clean gas is connected to the raw gas. This switching takes place by means of two valves for each chamber, with the valves preferably being configured in the form of poppet valves. Due to this switching, the raw gas is provided with the heat which has previously been accumulated in the clean gas chamber, and vice versa.

Since in the system according to the invention the reduction catalyst is arranged between the heat-accumulator chambers above the heat-accumulator material, only low expenditure for equipment is required for the SCR reaction. In addition, as the denitrified hot clean gas is used for preheating the raw gas, high thermal efficiency of, for example, 90 to 95% and more can be achieved with the system according to the invention.

The heat source in the recirculation system may, for example, be a burner or a heat exchanger.

The reducing agent with which the heated clean gas is mixed in the recirculation system may be a nitrogen-hydrogen compound, thus, for example, ammonia, which can be used both in gaseous form and in an aqueous solution, or, for example, urea as an aqueous solution or, preferably, gaseous ammonia catalytically produced from a pre-evaporated urea solution, e. g. a urea hydrolysis catalyst or H-cat (cf. e. g. EP 2 172 266 A1). The latter has the advantage that 2 moles of ammonia are generated per mole of urea, which can react with $NO_x$, whereas when urea is used directly, only one of the nitrogens contained in the molecule reacts with $NO_x$ and the second one generates N2O, which is a potent greenhouse gas.

In order to evenly introduce the reducing agent into the heat-accumulator chamber over the entire cross section and to uniformly supply the heat required for continuous operation to the preheated raw gas flow, a distribution grate is provided on the side of the heat-accumulator material of the heat-accumulator chambers facing the reduction catalyst for reducing the nitrogen oxides at a distance from the reduction catalyst, but in proximity to the heat-accumulator material.

By means of the distribution grate in the heat-accumulator chamber which the clean gas exits, a partial flow of the hot clean gas is taken via the recirculation system, which is further heated and, mixed with the reducing agent, supplied to the distribution grate in the heat-accumulator chamber in which the raw gas to be purified is preheated.

Preferably, the temperature of the partial flow heated by means of the heat source and mixed with the reducing agent is 270 to 550° C.

The size of the partial flow and the temperature thereof is calculated in such a way that the raw gas is heated to a temperature of 200 to 400° C., in particular 250 to 350° C., which is required for the SCR reaction.

Preferably, a bypass pipe for bypassing the heat source is provided in the recirculation system in order to set the temperature of the clean gas mixed with the reducing agent, which has been supplied to the distribution grate in the heat-accumulator chamber for preheating the raw gas to the temperature required for the SCR reaction. Thus, for example, a gas burner having a small installation size may be used as a heat source.

The heat-accumulator material preferably consists of extruded prism-shaped heat-accumulator bodies having a plurality of gas passage channels running in the direction of gas flow. Such heat-accumulator materials are described in EP 0 472 605 A1. The catalyst material may likewise consist of such extruded ceramic prism-shaped bodies with gas passage channels running in the direction of gas flow.

The catalyst may be made from the aforementioned SCR catalyst materials. The reduction catalyst may, for example, consist of $TiO_2$ as the main component with 1 to 5 percent by weight of vanadium oxide and/or tungsten oxide. The SCR catalyst, thus the catalyst for the reduction of the nitrogen oxides, can be configured in such a way that the system according to the invention can also be used for the catalytic oxidation of dioxin and/or furan. The addition of a reducing agent is, of course, not provided if no denitrification but only oxidation of dioxin and/or furan takes place.

One problem with SCR systems is the so-called ammonia slip, i. e. traces of ammonia which cannot be converted by the catalyst and can thus escape into the open air. According to legal provisions, the waste gas released may only contain minor traces of ammonia, typically less than 20 ppm.

Therefore, in order to ensure a high mixing quality of the reducing agent with the raw gas, it is, according to the invention, not injected directly but in a partial flow of clean gas taken downstream of the SCR catalyst via the non-required distribution grate. The high quality of the mixture of the reducing agent with the partial flow of clean gas is ensured by the arrangement of the reducing agent nozzles, the place of insertion and, for example, by a static mixer downstream of the injection site.

In order to rule out an ammonia slip, the reducing agent is preferably added sub-stoichiometrically, i. e., for example, the $NH_3/NO_x$ mole ratio is preferably less than 1.

In order to counteract the slip of the reducing agent during switching, the injection of the reducing agent in the recirculation system is interrupted shortly before switching, and the reducing agent residues in the partial flow of the recirculation pipe are expelled by the preheated clean gas. This ensures that no reducing agent is left in the distribution grate and upstream of the SCR catalyst at the time of switching. This will hardly affect the $NO_x$ purification, because, due to its accumulation capability, the SCR catalyst has accumulated sufficient reducing agent in order to maintain the $DeNO_x$ reaction.

The heat-accumulator material preferably consists of ceramic heat-accumulator bodies with prism-shaped channels and with an open porosity of less than 10%, in particular less than 5%, in order to avoid that $NO_x$ and/or the reducing agent or other pollutants can adsorbe on the surface of the heat exchanger.

The SCR catalyst material preferably consists of honeycomb blocks having channels running in the direction of flow.

In addition, an oxidation catalyst may be arranged directly on the heat-accumulator material. In this way, an additional supporting grid is saved. The oxidation catalyst serves the purpose of purifying oxidizable pollutants in the raw gas, e. g. organic compounds or carbon monoxide. This arrangement prevents the reducing agent from being also oxidized by the oxidation catalyst, because it is located upstream of the injection sites of the clean gas/reducing agent mixture. Since a further oxidation catalyst layer is arranged on the heat-accumulator material downstream of the SCR catalyst, it is ensured that pollutants which have not been fully oxidized as well as a possibly existing slip of the reducing agent are oxidized almost completely.

DESCRIPTION OF THE DRAWINGS

The invention will be described in more detail below with reference to the accompanying drawings, which show schematically.

TECHNICAL FIELD OF THE INVENTION

Figure 1:
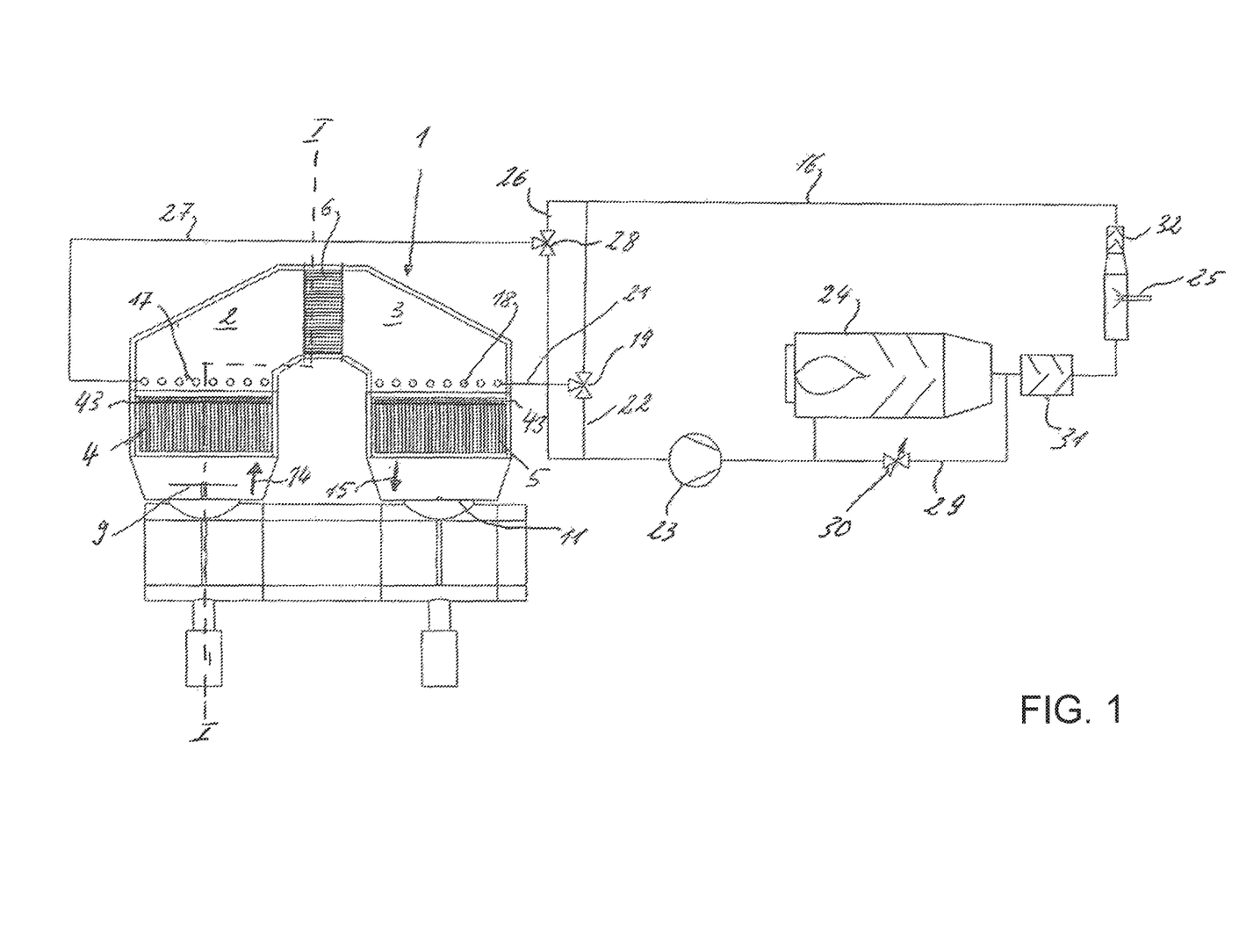
FIG. 1 is a longitudinal section through a system having a reactor with one pair of heat-accumulator chambers containing heat-accumulator materials.
Figure 2:
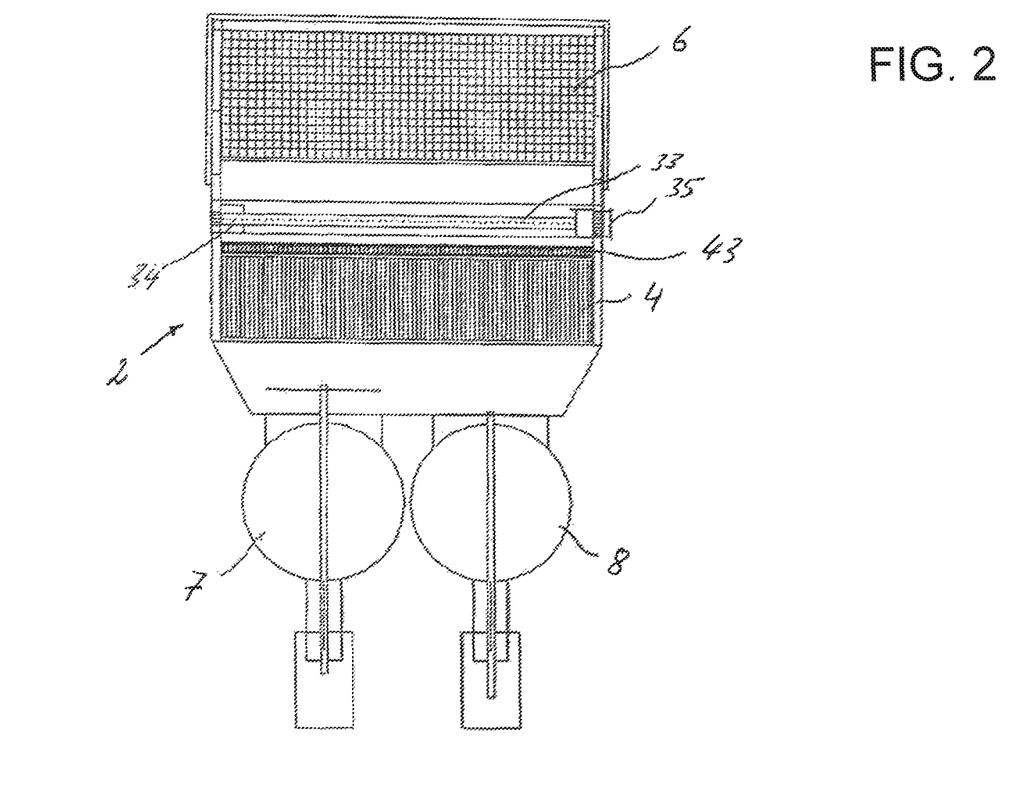
FIG. 2 is a vertical section through the system according to the line I-I in FIG. 1.
Figure 3:
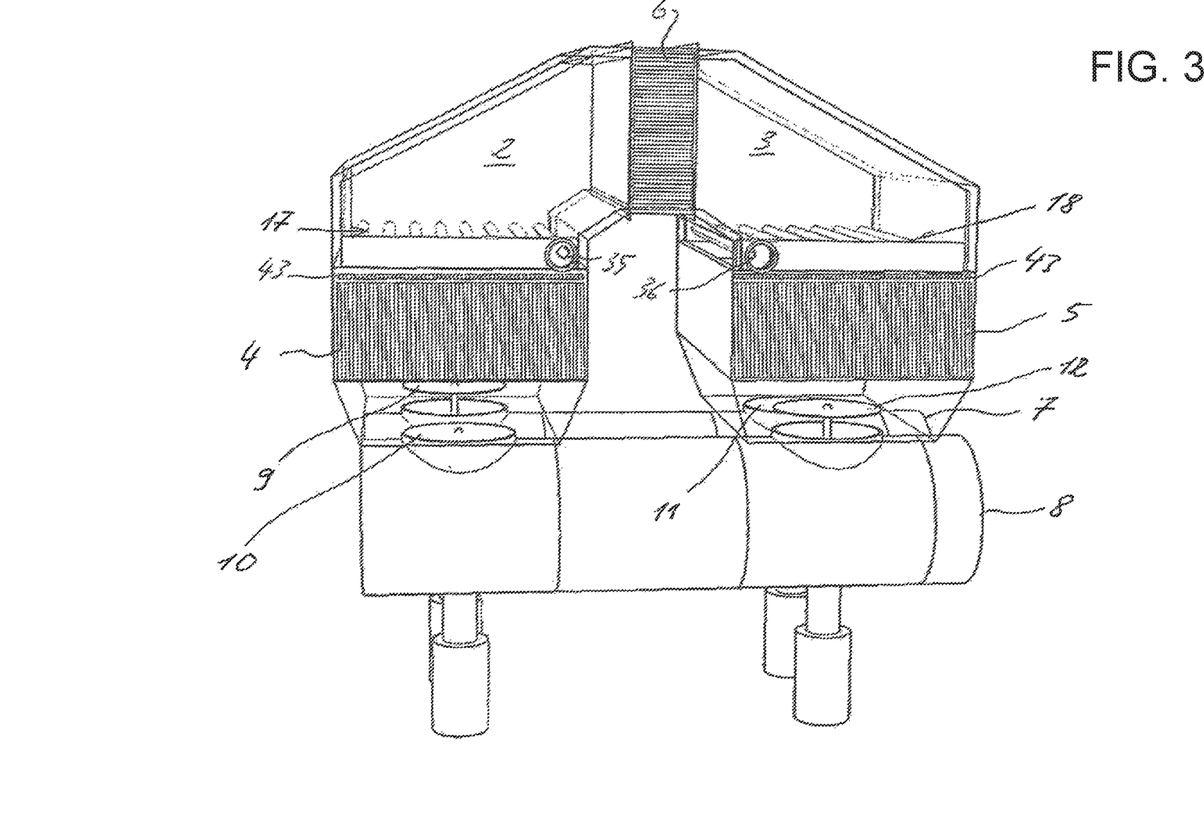
FIG. 3 is a perspective view of a partial longitudinal section through the system according to FIG. 1.

According to FIGS. 1 to 3, the reactor 1 has a first heat-accumulator chamber 2 and a second heat-accumulator chamber 3, each containing a heat-accumulator material 4 and 5, respectively, and being connected to one another by means of a SCR catalyst 6 for the reduction of nitrogen oxides.

The raw gas to be purified is supplied to the reactor 1 via the raw gas supply pipe 7, whereas the clean gas escapes into the open air via the clean gas pipe 8. According to FIGS. 1 to 3, the shut-off device 9 for supplying the raw gas to the heat-accumulator chamber 2 is opened and the shut-off device 10 for discharging the clean gas is closed, whereas the shut-off device 11 for supplying the raw gas to the heat-accumulator chamber 3 is closed and the shut-off device 12 for discharging the clean gas from the heat-accumulator chamber 3 is opened (FIG. 3). The shut-off devices 9 to 12 may be configured in the form of valves and are, for example, operated by means of linear drives.

Thus, the waste gas or raw gas charged with nitrogen oxides can alternately enter the heat-accumulator chambers 2 or 3. According to FIGS. 1 to 3, the raw gas enters the heat-accumulator chamber 2 and the clean gas exits the heat-accumulator chamber 3, as indicated in FIG. 1 by the arrows 14 and 15, respectively.

In this process, the raw gas 14 is preheated by the heat-accumulator material 4, which has been heated by the clean gas exited before.

In order to reduce the nitrogen oxides, the raw gas 14 is mixed with a reducing agent, for example ammonia, and supplied to the SCR catalyst 6. When exiting the heat-accumulator chamber 3, the denitrified hot clean gas 15 heats the heat-accumulator material 5 thereof.

For reducing the nitrogen oxides by means of the reducing agent, for example ammonia, by the SCR catalyst 6, a temperature of, for example, 200 to 350° C. is required.

In order to reach this temperature, the system has a recirculation system with a circulation pipe 16 and a distribution grate 17 and 18 arranged on the side of the heat-accumulator material 4, 5 of the heat-accumulator chambers 2, 3 facing the SCR catalyst 6 at a distance from the SCR catalyst 6.

By means of the distribution grate 18 in the heat-accumulator chamber 3 which the clean gas exits, for example, a partial flow of the hot clean gas is taken from the hot clean gas in the heat-accumulator chamber 3 with the circulation pipe 16 via the three-way valve 19 and the connecting pipes 21, 22 with the fan 23, further heated by means of a heat source 24, for example a burner, and mixed with the reducing agent, e. g. ammonia, by means of a device 25 to then be supplied as hot clean gas mixed with the reducing agent via the connecting pipes 26, 27 and the three-way valve 28 to the distribution grate 17 in the heat-accumulator chamber 2 in order to heat the raw gas in the heat-accumulator chamber 2 to a temperature of 200 to 450° C. required for the reduction of the nitrogen oxides contained in the raw gas.

The partial flow of the clean gas taken from the heat-accumulator chamber 3 which the clean gas exits may, for example, be 2 to 15 percent.

For bypassing the heat source 24, a bypass pipe 29 with a control valve 30 is provided, which is followed by the mixer 31 in the circulation pipe 16.

As a result, only a part of the partial flow of the clean gas can be supplied to the heat source 24, which is then combined with the remaining partial flow before the reducing agent is introduced into the partial flow by means of the device 25.

Thus, the temperature of the heat source 24 can be chosen to be so high that neither CO nor other partly combusted fuel residues are to be expected therein.

In order to minimize pressure loss, it is also possible to supply practically the entire partial flow in the circulation pipe 16 to the heat source 24 in case of a low nitrogen oxide content of the raw gas 14, to supply a part of the partial flow to the heat source 24 and a part to the bypass pipe 29 in case of a medium nitrogen oxide content of the raw gas 14 and, if necessary, to supply the entire partial flow via the bypass pipe 29 past the heat source 24 to the reducing agent supply device 25 in case of a high nitrogen oxide content of the raw gas 14.

In the circulation pipe 16, the device 25 for supplying the reducing agent is followed by the mixer 32 for distributing the reducing agent injected by the device 25 in the heated partial flow.

Figure 4:
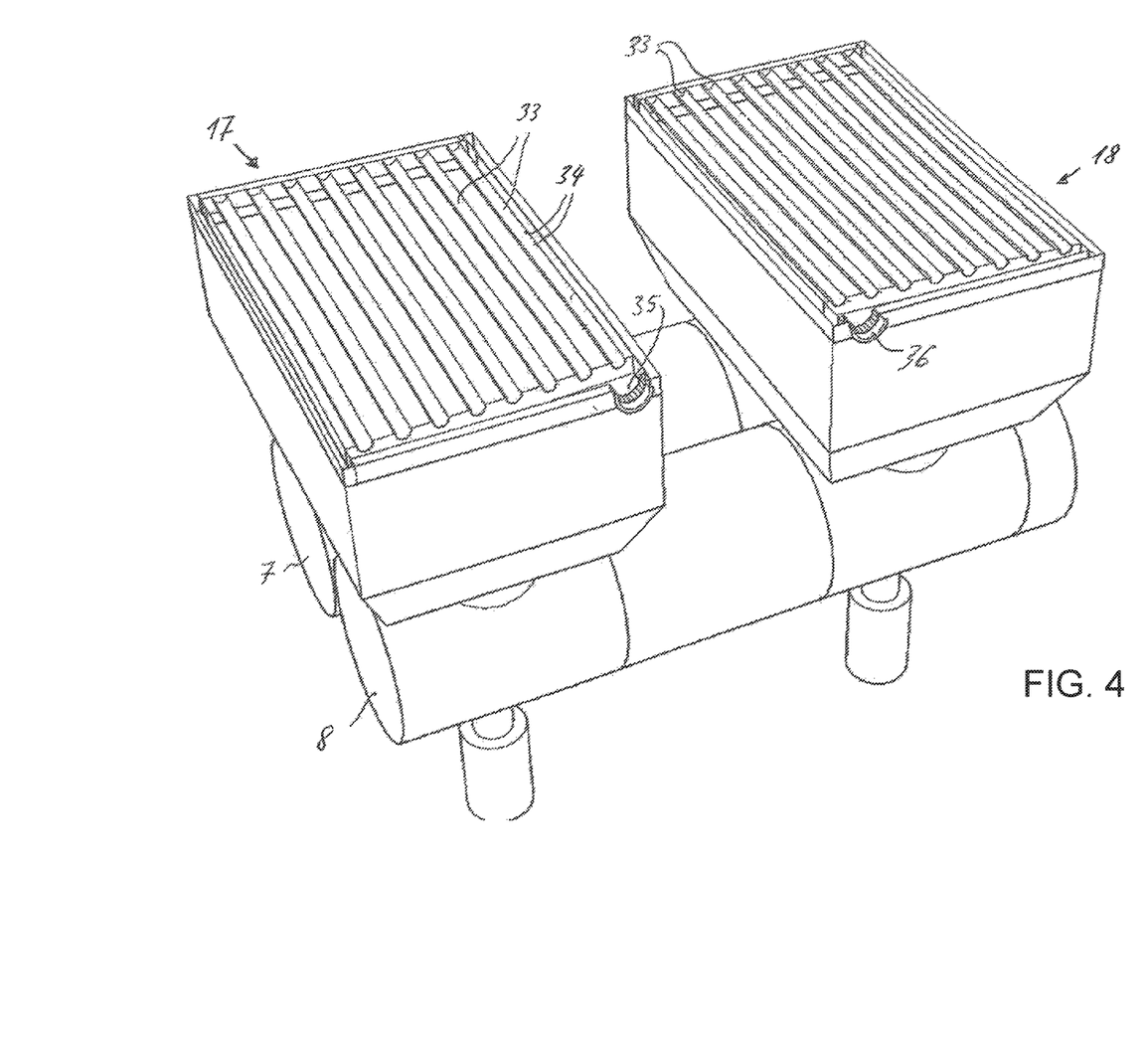
FIG. 4 is a perspective view of the distribution grates and the raw gas supply and clean gas discharge channels of the system according to FIGS. 1 to 3.

As is apparent, in particular, from FIG. 4, the distribution grates 17, 18 have pipes 33 extending across the heat-accumulator chambers 2, 3 and being provided with a plurality of lateral openings 34 for evenly distributing the reducing agent over the cross section of the heat-accumulator chambers 2, 3 and/or for extracting the clean gas. The pipes 33 in the heat-accumulator chamber 2 are connected to a collecting pipe 35, and the pipes 33 in the heat-accumulator chamber 3 are connected to a collecting pipe 36.

Figure 5:
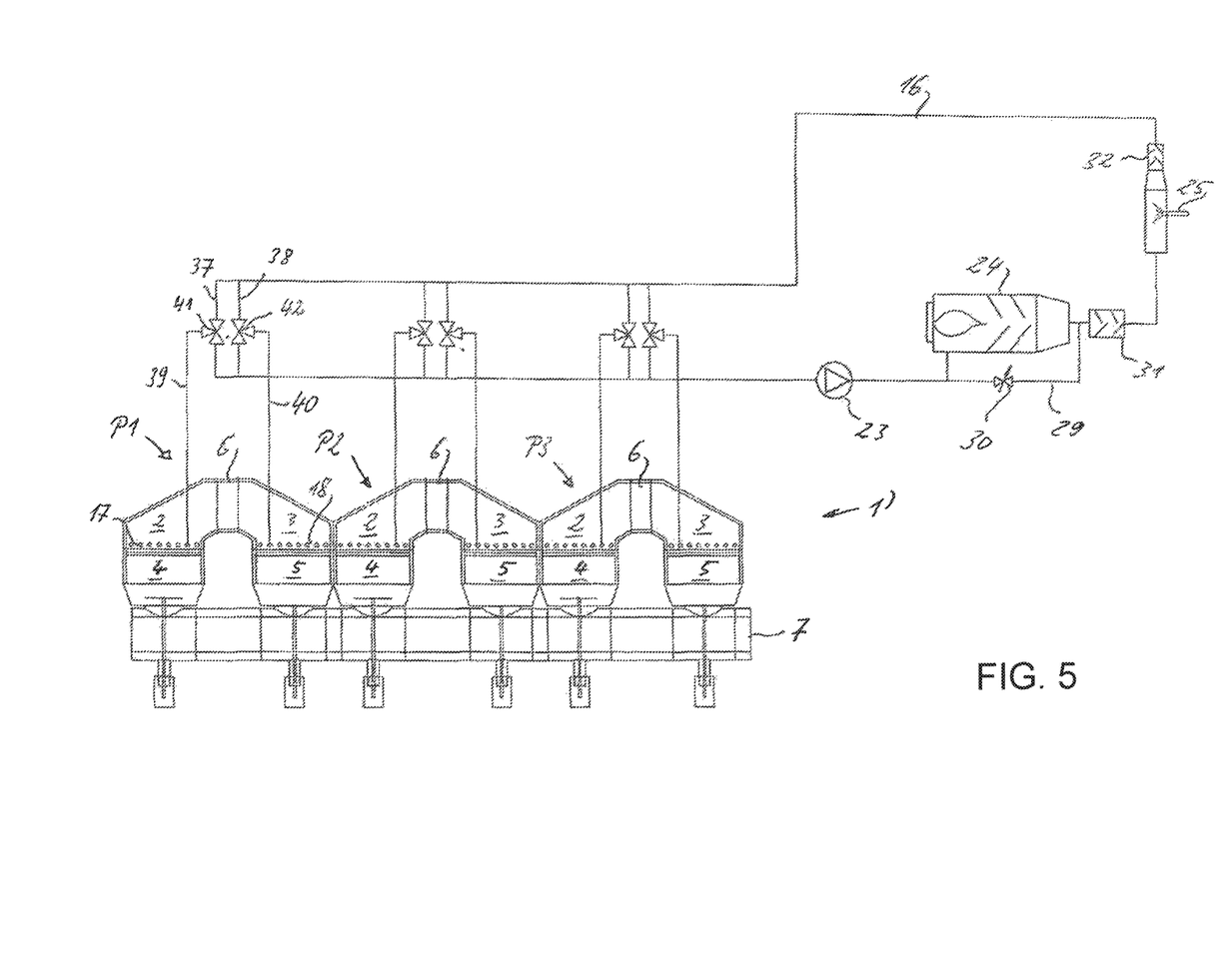
FIG. 5 is a longitudinal section through a system having a reactor with three pairs of heat-accumulator chambers containing heat-accumulator materials.

According to FIG. 5, the reactor 1' has several, namely three pairs P1, P2, P3 of heat-accumulator chambers 2 and 3, with each pair P1, P2, P3 comprising a heat-accumulator chamber 2, which the raw gas from the common raw gas supply pipe 7 enters, with a heat-accumulator material 4 and a distribution grate 17, and a heat-accumulator chamber 3, which the clean gas exits, with a heat-accumulator material 5 and a distribution grate 18 as well as a SCR catalyst 6 arranged between the two heat-accumulator chambers 2 and 3 of each pair P1, P2 and P3.

As shown in FIG. 5 based on the example of the pair P1, the circulation pipe 16 of the recirculation system can be connected to the distribution grates 17, 18 via connecting pipes 37 to 40 and two three-way valves 41, 42.

By means of the distribution grate 18, a partial flow of the clean gas is taken from the heat-accumulator chambers 3 of each pair P1, P2 and P3, which the clean gas exits. As shown in FIG. 5 in respect of the pair P1, the partial flows taken are supplied via the connecting pipes 40, 38 and the three-way valve 42 to the circulation pipe 16 of the recirculation system, heated by means of the heat source 24, mixed with the reducing agent by means of the device 25 and supplied via the connecting pipes 37, 39 and the three-way valve 41 to the distribution grate 17 in the heat-accumulator chamber 2, which the raw gas enters.

Thus, by using a single heat source 24 and a single reducing agent supply device 25, the raw gas can be heated and mixed with the reducing agent required for denitrification in all heat-accumulator chambers 2 of a reactor with pairs P1, P2, P3 of heat-accumulator chambers 2, 3.

As is apparent, in particular, from FIGS. 1 and 2, each heat-accumulator chamber 2, 3 has an oxidation catalyst 43 between the heat-accumulator material 4, 5 and the distribution grate 17, 18 for oxidizing organic compounds and/or carbon monoxide contained in the waste gas. This arrangement of the oxidation catalyst 43 ensures that the reducing agent, for example ammonia, which is injected by the distribution grate 17 and 18, respectively, is not combusted by the oxidation catalyst 43.

Figure 6:
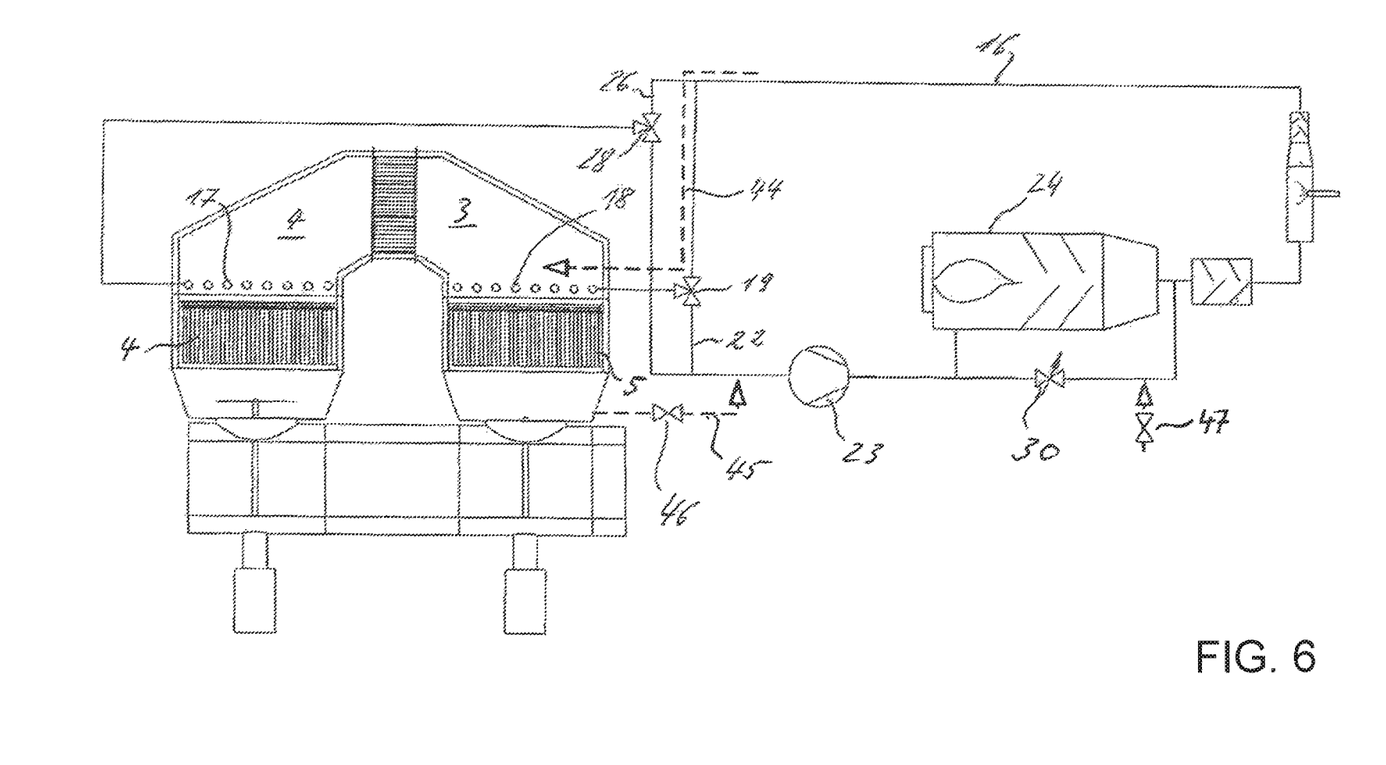
FIG. 6 is a view of the system corresponding to FIG. 1 as an illustration of the pyrolysis of deposits on the heat-accumulator materials.

In order to remove organic deposits on the heat-accumulator materials 4, 5, pyrolysis can be carried out by means of the recirculation system. For this purpose, as shown in FIG. 6, gas with a temperature of at least 400° C. is supplied to the heat-accumulator chamber 3 with the distribution grate 18 by means of the circulation pipe 16 according to the dashed line, with the gas having been generated by means of the heat source 24 configured in the form of a burner and passing through the heat-accumulator material 5 in order to pyrolytically decompose the deposits contained therein. As also indicated by dashed lines, the gas with the pyrolysis products is drawn via a pipe 45 with a shut-off device 46 into the heat source 24 configured in the form of a burner for combusting the pyrolysis products. During this process, the control valve 30 is closed completely in order to prevent pyrolysis products from accumulating in the recirculation system.

If the temperature is too high, the hot gases exiting the heat source are cooled by opening the fresh-air valve 47. The valve 47 also serves the purpose of maintaining the minimum residual oxygen content in the hot gas required for the complete combustion of the pyrolysis gases. Organic deposits in the heat-accumulator material 4 of the heat-accumulator chamber 2 can be removed in a corresponding manner. It is needless to say that the device 25 for supplying the reducing agent is out of operation during this process.

EXAMPLE

A waste gas arising from the production of cement clinker having a flow rate of 400 000 Nm$^3$/h and a temperature of 150° C. is composed as follows:
CO2 10.7 vol %
H2O 12.2 vol %
O2 8 vol %
N2 69 vol %
SO2 500 mg/m$^3$
CO 1000 mg/m$^3$
NO 800 mg/m$^3$
Corg 50 mg/m$^3$ This waste gas is guided via the raw gas collector 7 to a system having altogether six heat-accumulator chambers 2, 3 or regenerators, with the first, third and fifth regenerator being used as raw gas regenerators 2 by means of the inlet valves. There, the raw gas is heated to a temperature of 290° C. by means of a heat-accumulator bed 5 with extruded honeycomb blocks arranged in parallel and one above the other and having an overall dimension of 4.5 m×7 m and a height of 1.5 m. A honeycomb-shaped oxidation catalyst 43 having openings of 3 mm and a height of 150 mm is arranged thereon. When passing through said oxidation catalyst, CO is reduced to 200 mg/Nm$^3$ and Corg to 10 mg/Nm$^3$. By means of three horizontal distribution grates 17 with eight parallel pipes 33 each of which comprises 150 lateral openings 34 of 10 mm in diameter, a clean gas being enriched with 12 g/Nm$^3$ ammonia is then added at a temperature of 420° C. and in a quantity of 5000 Nm$^3$/h per regenerator.

This mixture, which has now a temperature of 295° C., is passed through a honeycomb-shaped reduction catalyst 6 with horizontal channels. The three catalyst packs each have a dimension of 1.2×7×2.5 m.

Behind the catalyst 6, nitrogen oxides NO have been reduced to 80 mg/m$^3$. Due to the reaction by the catalyst 6, the waste gas has heated to 300° C. The waste gas now flows into the three clean gas regenerators, with a partial flow of altogether 15 000 Nm$^3$/h being drawn off by the grates 18.

The partial flow drawn off is supplied via a three-way valve 19 to a combustion chamber 24, where one part of the waste gas is heated to 800° C. A second part of the gas is added by means of a bypass pipe 29 following the combustion chamber 24, as a result of which the mixing temperature reaches 500° C.

After that, 730 kg/h of a 25 percent ammonia solution is supplied in a second mixing chamber 25 so that the concentration of ammonia in the gas flow reaches 12 g/Nm$^3$. This partial flow is supplied to the raw gas in front of the nitrogen oxide reduction catalyst 6 by means of the distribution grate 17 at a temperature of 420° C. When passing through the oxidation catalyst above the clean gas heat exchanger, the remaining CO is reduced from 200 to 40 mg/Nm$^3$ and the Corg content from 10 to 2 mg/Nm$^3$.

The purified main waste gas flow now flows into the outlet regenerators and exits the system via the respective clean gas valves of the second, fourth and sixth regenerator at a temperature of 150° C.

Every two minutes, the regenerators are switched alternately in the reverse direction of flow.

The invention claimed is:

1. Process for the purification of waste gases charged with nitrogen oxides in a reactor with heat-accumulator chambers containing heat-accumulator materials, comprising a process in which waste gases to be purified enter at least one of the heat-accumulator chambers and are preheated by the heat-accumulator material therein,
   are mixed with a reducing agent and a catalyst for reducing nitrogen oxide therein, producing denitrified hot clean gas that heats the heat-accumulator material in at least another of the heat-accumulator chambers, characterized by a recirculation system in which a partial flow of denitrified clean gas is taken from the at least one of the other heat-accumulator chambers which the denitrified clean gas exits before the denitrified clean gas enters the heat-accumulator material in another of the heat-accumulator chambers, the heat accumulation material in another of the heat-accumulator chambers being heated by means of a heat source,
   and in which a distribution grate is provided on the side of the heat-accumulator material of the heat-accumulator chambers facing the reduction catalyst for reducing the nitrogen oxides, a partial flow of the denitrified hot clean gas can be taken by the recirculation system by means of the distribution grate in the heat-accumulator chamber which the denitrified hot clean gas exits, further heated by means of the heat source and, mixed with the reducing agent, supplied to the distribution grate in the heat-accumulator chamber for heating the waste gases to be purified to the temperature required for the reduction of the nitrogen oxides, further in which the recirculation system has a circulation pipe by means of which the denitrified hot clean gas can be supplied from the distribution grate via a multi-way valve to the heat source, then to a device for supplying the reducing agent and via a multi-way valve to the distribution grate in the heat-accumulator chamber for heating the waste gases to be purified to the temperature required for the reduction of the nitrogen oxides.

2. Process according to claim 1, characterized in that the reactor has a plurality of pairs (P1, P2, P3) of heat-accumulator chambers, wherein each pair (P1, P2, P3) comprises a heat-accumulator chamber which the waste gases enters, a catalyst for reducing the nitrogen oxides and a heat-accumulator chamber which the clean gas exits, wherein a partial flow of the denitrified hot clean gas is taken from each of the heat-accumulator chambers which the denitrified hot clean gas exits and the partial flows taken are collectively supplied to the heat source by means of the recirculation system, mixed with the reducing agent and supplied again as a partial flow to the heat-accumulator chambers of the pairs (P1, P2, P3) which the waste gases enter.

3. Process according to claim 1, characterized in that the partial flow of the denitrified hot clean gas taken from the heat-accumulator chamber which the denitrified hot clean gas exits is between 2 and 15 percent of the clean gas.

4. Process according to claim 1, characterized in that only a part of the partial flow of the denitrified hot clean gas is supplied to the heat source and combined again with the remaining partial flow before being mixed with the reducing agent.

5. Process according to claim 1, characterized in that the partial flow of the denitrified hot clean gas with a temperature of at least 350° C. is mixed with the reducing agent.

6. Process according to claim 1, characterized in that the waste gases charged with nitrogen oxides contains organic compounds and/or carbon monoxide and each heat-accumulator chamber has a catalyst for oxidizing the organic compounds and/or carbon monoxide.

7. Process according to claim 1, characterized in that the waste gas charged with nitrogen oxides are the waste gases of an industrial process in which, due to the high processing temperature, nitrogen oxides are generated in the presence of air.

8. Process according to claim 1, characterized in that, for the pyrolysis of deposits on the heat-accumulator materials by means of the recirculation system, gas with a temperature of at least 400° C. is passed through the heat-accumulator material in order to pass it through the heat-accumulator material again after the pyrolysis products have been combusted by means of the heat source.

9. Process according to claim 1, characterized in that, due to a conversion of $NO_x$, hydrocarbons and carbon monoxide, energy required for the reaction by the catalysts is at least partially or entirely provided by the process and thus, necessary primary energy is reduced or no longer required.

10. The process according to claim 1, characterized by a bypass pipe for bypassing the heat source in order to set the temperature of the denitrified clean gas mixed with the reducing agent by means of the reducing agent supply device, which can be supplied to the distribution grate in the heat-accumulator chamber for heating the waste gases to the temperature required for the reduction of the nitrogen oxides.

11. The process according to claim 1, characterized in that a mixer is arranged downstream of the reducing agent supply device in the circulation pipe.

12. Process for the purification of waste gases charged with nitrogen oxides in a reactor with heat-accumulator chambers containing heat-accumulator materials comprising a process in which waste gases to be purified enter at least one of the heat-accumulator chambers and are preheated by the heat-accumulator material therein, are mixed with a reducing agent and a catalyst for reducing the nitrogen oxides therein, producing denitrified hot clean gas that heats the heat-accumulator material in at least another of the heat-accumulator chambers, characterized by a recirculation system in which a partial flow of denitrified clean gas is taken from the at least one of the heat-accumulator chambers which the denitrified clean gas exits before the denitrified clean gas enters the other heat-accumulator material in another of the heat-accumulator chambers that is heated by means of a heat source, and in which a distribution grate is provided on the side of the heat-accumulator material of the heat-accumulator chambers facing the reduction catalyst for reducing the nitrogen oxides, a partial flow of the denitrified hot clean gas can be taken by the recirculation system by means of the distribution grate in the heat-accumulator chamber which the denitrified hot clean gas exits, further heated by means of the heat source and, mixed with the reducing agent, supplied to the distribution grate in the heat-accumulator chamber for heating the waste gases to be purified to the temperature required for the reduction of the nitrogen oxides, further in which the distribution grates have pipes extending across the heat-accumulator chamber and including a plurality of lateral openings for adding the reducing agent over the cross section of the heat-accumulator chamber.

13. The process according to claim 12, characterized in that, for supplying the waste gases and for discharging the denitrified hot clean gas, a waste gas supply pipe is provided for the heat-accumulator chambers.

14. The process according to claim 12, characterized in that the reduction catalyst is also suited for the reduction of hydrocarbons, dioxin and furan as well as other carbonic substances.

15. The process according to claim 12, characterized in that, an oxidation catalyst is arranged between the heat-accumulator material and the distribution grate in each heat-accumulator chamber for oxidizing organic compounds and/or carbon monoxide entering the waste gases.

* * * * *